United States Patent
Satoh et al.

(10) Patent No.: US 10,257,870 B2
(45) Date of Patent: Apr. 9, 2019

(54) PAIRING OF ELECTRONIC DEVICES USING NEAR FIELD WIRELESS COMMUNICATION

(71) Applicant: SONY CORPORATION, Tokyo (JP)

(72) Inventors: Yoshinori Satoh, Saitama (JP); Kanahiro Shirota, Kanagawa (JP); Takashi Tsurumoto, Saitama (JP); Naoki Sugita, Tokyo (JP)

(73) Assignee: SONY CORPORATION, Tokyo (JP)

( * ) Notice: Subject to any disclaimer, the term of this patent is extended or adjusted under 35 U.S.C. 154(b) by 4 days.

(21) Appl. No.: 14/640,274

(22) Filed: Mar. 6, 2015

(65) Prior Publication Data
US 2015/0264732 A1    Sep. 17, 2015

(30) Foreign Application Priority Data
Mar. 14, 2014  (JP) .................. 2014-050980

(51) Int. Cl.
| | | |
|---|---|---|
| H04W 4/80 | (2018.01) | |
| H04W 76/14 | (2018.01) | |
| H04B 5/00 | (2006.01) | |
| H04L 29/06 | (2006.01) | |
| H04W 12/04 | (2009.01) | |

(52) U.S. Cl.
CPC .......... *H04W 76/14* (2018.02); *H04B 5/0031* (2013.01); *H04L 63/18* (2013.01); *H04W 12/04* (2013.01); *H04W 4/80* (2018.02)

(58) Field of Classification Search
CPC ..... H04W 76/023; H04W 76/14; H04W 4/80; H04W 12/06; H04W 84/12; H04W 84/18; H04W 12/04; H04W 88/02; H04W 12/08; H04W 76/10; H04W 84/10; H04B 5/0031; H04B 5/0025; H04B 5/0056; H04B 1/401; H04B 5/00; H04B 5/0062; H04B 5/0068; H04B 5/0075; H04B 7/24

USPC .......................... 455/41.1, 41.2, 411, 41.3

See application file for complete search history.

(56) References Cited

U.S. PATENT DOCUMENTS

| | | | | |
|---|---|---|---|---|
| 2007/0001809 A1* | 1/2007 | Kodukula | ............ | G06K 7/0008 340/10.1 |
| 2008/0219230 A1* | 9/2008 | Lee | ................... | H04L 29/12518 370/338 |
| 2012/0100803 A1* | 4/2012 | Suumaki | ........... | H04W 36/0072 455/41.1 |
| 2013/0005250 A1* | 1/2013 | Kim | ................... | H04N 21/4126 455/41.1 |
| 2013/0189924 A1* | 7/2013 | Pedro | ...................... | H04W 4/80 455/41.1 |
| 2014/0099889 A1* | 4/2014 | Seo | ........................ | H04W 4/80 455/41.1 |

FOREIGN PATENT DOCUMENTS

JP  2009-188539 A  8/2009

* cited by examiner

*Primary Examiner* — Philip Sobutka
(74) *Attorney, Agent, or Firm* — Chip Law Group (57) ABSTRACT

An electronic device includes a first communication unit which performs wireless communication with another electronic device, and a second communication unit which carries out transactions of information, which is necessary for pairing with the other electronic device performed by the first communication, with the other electronic device using near field wireless communication.

16 Claims, 9 Drawing Sheets

PAIRING OF ELECTRONIC DEVICES USING NEAR FIELD WIRELESS COMMUNICATION

CROSS REFERENCE TO RELATED APPLICATIONS

This application claims the benefit of Japanese Priority Patent Application JP 2014-050980 filed Mar. 14, 2014, the entire contents of which are incorporated herein by reference.

BACKGROUND

The present technology relates to an electronic device. Specifically, the present technology relates to an electronic device and a communication system which carry out transactions of various information using wireless communication, a control method thereof, and a program which causes a computer to execute the method.

In the related art, wireless communication technology exists in which transactions of various information are carried out between two electronic devices using wireless communication. An electronic device exists in which, before carrying out transactions of various information between two electronic devices using wireless communication, one-on-one association (pairing) is necessary.

For example, an electronic device which performs a pairing process after the power source is turned on is proposed (for example, refer to Japanese Unexamined Patent Application Publication No. 2009-188539).

SUMMARY

According to the technology of the related art described above, it is possible to easily perform pairing with a desired electronic device. However, in general, since the pairing sequence is a complex sequence in which various information is exchanged, there is a concern that the pairing using wireless communication will fail. Therefore, it is important to appropriately carry out the transactions of the information that is necessary for the pairing.

It is desirable to appropriately carry out the transactions of the information that is necessary for the pairing.

According to an embodiment of the present technology, there is provided an electronic device which includes a first communication unit which performs wireless communication with another electronic device, and a second communication unit which performs transactions of information, which is necessary for pairing with the other electronic device performed by the first communication unit, with the other electronic device using near field wireless communication. This results in the effect of transactions of the information that is necessary for pairing with the other electronic device performed by the first communication are carried out with the other electronic device unit using near field wireless communication.

In the embodiment, the information may be connection destination information relating to each of the electronic device and the other electronic device, the second communication unit may be provided with readable and writable memory, and, the connection destination information relating to the electronic device that is held in the memory may be read and output to the other electronic device using the near field wireless communication, and the connection destination information relating to the other electronic device may be written to the memory using the near field wireless communication. This results in the effect of the connection destination information relating to the electronic device that is held in the memory being read and output to the other electronic device using the near field wireless communication, and the connection destination information relating to the other electronic device being written to the memory using the near field wireless communication.

In the embodiment, the electronic device may further include a control unit which sets the connection destination information that is written to the memory as valid connection destination information at a timing at which a power source of the electronic device is turned on. This results in the effect of the connection destination information that is written to the memory being set as valid connection destination information at a timing at which a power source of the electronic device is turned on.

In the embodiment, the electronic device may further include a control unit which performs a connection process with the other electronic device temporarily using the connection destination information that is written to the memory at a timing at which a power source of the electronic device is turned on, and sets the connection destination information as valid connection destination information when the connection process is successful. This results in the effect of a connection process with the other electronic device being performed temporarily using the connection destination information that is written to the memory at a timing at which a power source of the electronic device is turned on, and the connection destination information being set as valid connection destination information when the connection process is successful.

In the embodiment, the second communication unit may carry out the transactions of information with the other electronic device using the near field wireless communication even in a state in which a power source of the electronic device is not turned on. This results in the effect of the transactions of information being carried out with the other electronic device using the near field wireless communication even in a state in which a power source of the electronic device is not turned on.

In the embodiment, the second communication unit may carry out the transactions of information with the other electronic device via an information processing device capable of the near field wireless communication. This results in the effect of the transactions of information with the other electronic device being carried out via an information processing device capable of the near field wireless communication.

In the embodiment, the second communication unit may carry out the transactions of key information, which is used in wireless communication with the other electronic device performed by the first communication unit, with the other electronic device using the near field wireless communication. This results in the effect of the transactions of key information that is used in wireless communication with the other electronic device performed by the first communication unit being carried out with the other electronic device using the near field wireless communication.

In the embodiment, the wireless communication performed by the first communication unit may be a different communication system from the near field wireless communication performed by the second communication unit. This results in the effect of the wireless communication performed by the first communication unit being performed using a different communication system from the near field wireless communication performed by the second communication unit.

According to another embodiment of the present technology, there is provided a communication system which includes a first electronic device and a second electronic device. The first electronic device includes a first communication unit which performs wireless communication with a second electronic device, and a second communication unit which carries out transactions of information, which is necessary for pairing with the second electronic device performed by the first communication unit, with the second electronic device using near field wireless communication. The second electronic device includes a communication unit which performs wireless communication with the first electronic device, and a control unit which carries out the transactions of information with the first electronic device via an information processing device capable of the near field wireless communication.

This results in the effect of the first electronic device carrying out the transactions of the information that is necessary in the pairing with the second electronic device performed by the first communication unit with the second electronic device using the near field wireless communication, and the second communication unit carrying out the transactions of information with the first electronic device via the information processing device capable of near field wireless communication.

According to an embodiment of the present technology, it is possible to achieve an excellent effect in that it is possible to appropriately carry out the transactions of the information that is necessary for the pairing. Note that, the present disclosure is not necessarily limited to the effects described above, and may exhibit any of the effects described in the present disclosure.

DETAILED DESCRIPTION OF EMBODIMENTS

Hereafter, description will be given of embodiments for realizing the present technology (hereinafter referred to as "embodiments"). The description will be given in the following order.
1. First Embodiment (example in which address information is exchanged using near field wireless communication)
2. Second Embodiment (example in which address information is set as valid address information on a condition that communication using the address information that is acquired using near field wireless communication is successful)

First Embodiment

Configuration Example of Communication System

Figure 1:
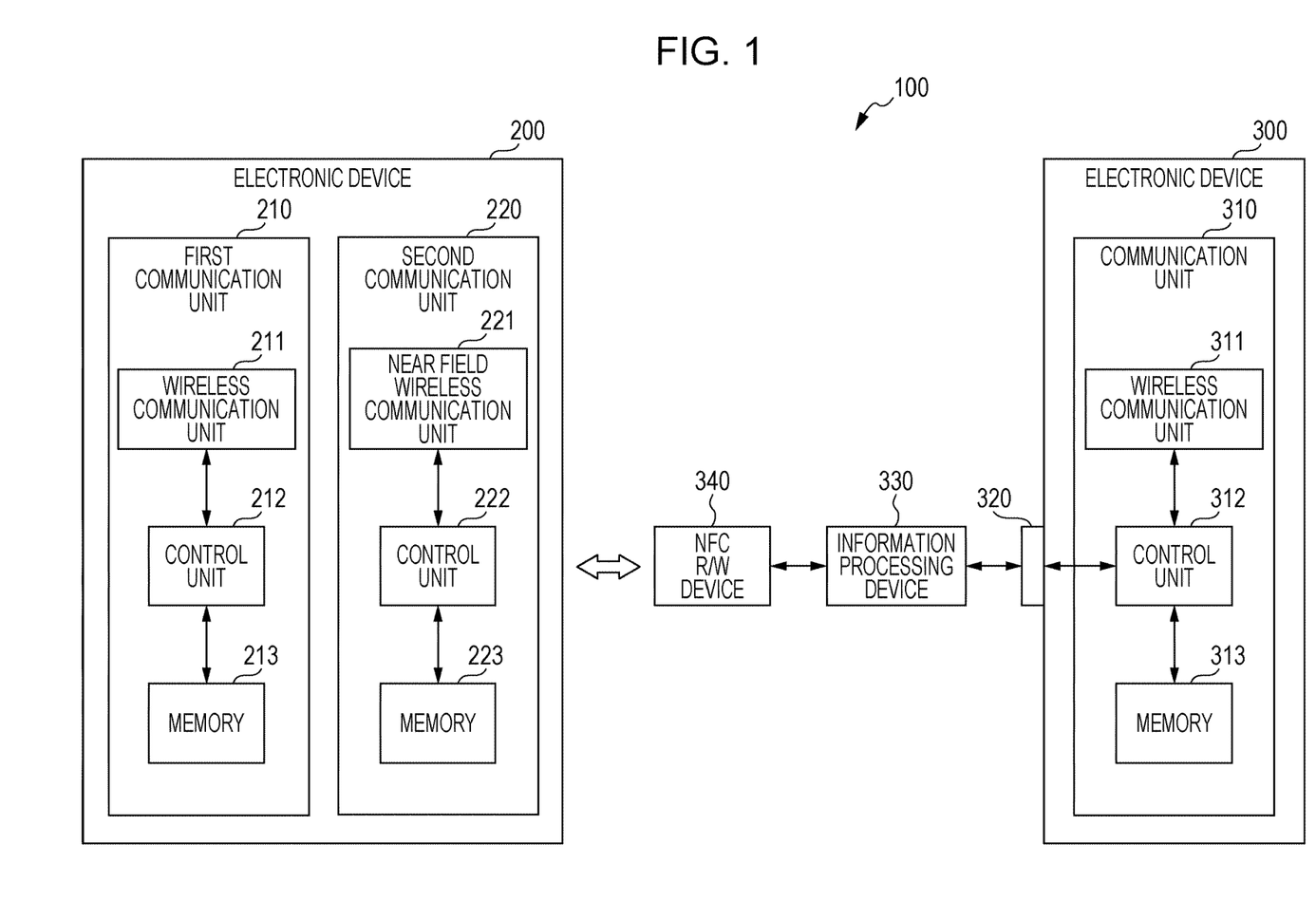
FIG. 1 is a diagram illustrating a configuration example of a communication system in a first embodiment of the present technology.

FIG. 1 is a diagram illustrating a configuration example of a communication system 100 in a first embodiment of the present technology.

The communication system 100 is provided with an electronic device 200, an electronic device 300, a connector for wiring connection 320, an information processing device 330, and a near field communication (NFC) reader and writer (R/W) device 340.

The electronic device 200 and the electronic device 300 are electronic devices capable of carrying out transactions of various information using wireless communication. In the first embodiment of the present technology, an example will be illustrated in which the electronic device 200 and the electronic device 300 are in the relationship of a controlling device and a controlled device.

In the first embodiment of the present technology, an example will be illustrated in which the electronic device 200 is the controlling device such as a radio frequency (RF) remote controller, and the electronic device 300 is the controlled device such as a television (TV). In the first embodiment of the present technology, an example will be illustrated in which an information transaction for which pairing between the controlling device (the electronic device 200) and the controlled device (the electronic device 300) is necessary is performed in a state in which the power source of the controlling device (the electronic device 200) is off (a state in which the power source is not turned on).

For example, it is possible to carry out the transactions of information which is necessary for the pairing between the controlling device (the electronic device 200) and the controlled device (the electronic device 300) using a communication unit capable of performing near field wireless communication even in a state in which the power source of the controlling device (the electronic device 200) is off. Note that, the communication unit capable of performing the near field wireless communication is, for example, an NFC tag.

The electronic device 200 is provided with a first communication unit 210 and a second communication unit 220. Note that, to facilitate explanation, description and depiction of the other configuration (for example, an operation reception unit, a display unit, and a control unit used in remote control operation) will be omitted with regard to the electronic device 200.

The first communication unit 210 is a wireless communication unit capable of performing wireless communication in a state in which the power source is on (a state in which the power source is turned on). For example, when the electronic device 200 is an RF remote controller, the first communication unit 210 carries out transactions of various information relating to the remote control operation using wireless communication.

The first communication unit 210 is provided with a wireless communication unit 211, a control unit 212, and a memory 213. The first communication unit 210 is realized using a system on a chip (SOC), for example.

The wireless communication unit 211 performs transmission and reception of various information (for example, control information relating to the remote control operation) between the electronic device 200 and another electronic device (for example, the electronic device 300) using wireless communication based on the control by the control unit 212. Examples of wireless communication systems that can be used include Bluetooth (registered trademark), ZigBee (registered trademark), a wireless local area network (LAN), and a wireless personal area network (WPAN). A wireless fidelity (Wi-Fi) network is an example of a wireless LAN which can be used.

The control unit 212 controls each part of the first communication unit 210 based on a control program. The control unit 212 is realized using a computing unit such as a micro-computer, for example.

The memory 213 is a memory which stores various information. Read-only nonvolatile memory (for example, read only memory (ROM)) is an example of the memory 213 which can be used. Note that, in the first embodiment of the present technology, an example is illustrated in which nonvolatile memory capable of electrically re-writing the content thereof is used as the memory 213. Electrically erasable and programmable read only memory (EEPROM) is an example of the nonvolatile memory.

The second communication unit 220 is a near field wireless communication unit capable of performing the near field wireless communication (contactless wireless communication) without the power source being necessary. The second communication unit 220 may be built into the electronic device 200, for example, and, may be attached to the outer portion of the electronic device 200.

The second communication unit 220 is provided with a near field wireless communication unit 221, a control unit 222, and a memory 223. The second communication unit 220 is realized using an NFC tag, for example.

The near field wireless communication unit 221 performs transmission and reception of various information (for example, address information) between the electronic device 200 and another electronic device (for example, the NFC R/W device 340) using near field wireless communication based on the control by the control unit 222. NFC can be used as an example of the wireless communication system that can be used. For example, NFC is FeLiCa (registered trademark), type-A or type-B as defined in 14443 of the international organization for standardization (ISO) or the international electrotechnical commission (IEC) for contactless integrated circuit (IC) cards, type-F as defined in ISO/IEC 18092, or the like.

In the first embodiment of the present technology, an example is illustrated in which a near field wireless communication wireless communication system is adopted in which the power source is not necessary, and in which pairing is not necessary.

The control unit 222 controls each part of the second communication unit 220 based on the control program.

The memory 223 is a memory which stores various information. Read-only nonvolatile memory (for example, ROM) is an example of the memory 223 which can be used. Note that, in the first embodiment of the present technology, an example is illustrated in which nonvolatile memory (for example, EEPROM) capable of electrically re-writing the content thereof is used as the memory 223. In other words, an example is illustrated in which re-writable memory is used as the memory 223.

The electronic device 300 is provided with a communication unit 310. Note that, to facilitate explanation, description and depiction of the other configuration (for example, when the electronic device 300 is a TV, a display unit, an audio output unit, and a control unit) will be omitted with regard to the electronic device 300.

The communication unit 310 is a wireless communication unit capable of performing wireless communication in a state in which the power source is on. For example, when the electronic device 300 is a TV and the electronic device 200 is an RF remote control, the communication unit 310 carries out transactions of various information relating to the remote control operation using wireless communication.

The communication unit 310 is provided with a wireless communication unit 311, a control unit 312, and a memory 313. Note that, the wireless communication unit 311, the control unit 312, and the memory 313 correspond respectively to the wireless communication unit 211, the control unit 212, and the memory 213 that are provided in the first communication unit 210 of the electronic device 200. Therefore, detailed description thereof will be omitted. Note that, the control unit 312 is capable of carrying out transactions of various information with the electronic device 200 via the NFC R/W device 340 capable of near field wireless communication and the information processing device 330.

Here, the wireless communication unit 211 and the wireless communication unit 311 perform wireless communication using the same wireless communication system. The wireless communication system used by the wireless communication unit 211 and the wireless communication unit 311 is different from the wireless communication system used by the near field wireless communication unit 221.

The wireless communication unit 211 and the wireless communication unit 311 use address information and key information when performing the wireless communication. The address information is information used to specify each of the electronic devices when performing the wireless communication. The address information is an example of the information that is necessary for the pairing. For example, the address information can be understood as connection destination information relating to each of the electronic device 200 and the electronic device 300. The key information is information used when performing the encryption and the encoding of the information that serves as an object to be communicated in the wireless communication.

For example, when using Wi-Fi as the wireless communication system, the address information is a MAC address, and the key information is a network key.

For example, when using Bluetooth as the wireless communication system, the address information is a Bluetooth device address, and the key information is a link key.

For example, a case will be assumed in which using ZigBee radio frequency for consumer electronics (RF4CE) is used as the wireless communication system. In this case, the address information is an institute of electrical and electronics engineers (IEEE) address (media access control (MAC) address). The key information is a security link key.

The connector for wiring connection 320 is a connector for connecting the electronic device 300 to the information processing device 330.

The information processing device 330 is an information processing device which performs control for carrying out transactions of various information between the second communication unit 220 of the electronic device 200 and the electronic device 300. For example, the information processing device 330 is realized using a personal computer.

The NFC R/W device 340 is connected to the information processing device 330, and performs the reading and writing of NFC tags based on the control of the information processing device 330. For example, the NFC R/W device 340 reads the address information that is stored in the memory 223 of the second communication unit 220 and outputs the address information to the information processing device 330. For example, the NFC R/W device 340 writes the address information that is output from the information processing device 330 to the memory 223 of the second communication unit 220.

For example, when a polling command is received from the NFC R/W device 340, the operations of the second communication unit 220 of the electronic device 200 are started. The second communication unit 220 of the electronic device 200 transmits a response (a polling response) to the NFC R/W device 340 in response to the polling command. Note that, in the first embodiment of the present technology, an example is illustrated in which the NFC R/W device 340 and the information processing device 330 are separate devices; however, the NFC R/W device 340 and the information processing device 330 may be configured integrally.

Communication Example of Address Information

FIGS. 2A to 3B are diagrams schematically illustrating a communication example of address information that is transacted between the electronic device 200 and the electronic device 300 in the first embodiment of the present technology.

For example, a case will be assumed in which an exchange process in which the address information is exchanged between the electronic device 200 (for example, an RF remote controller) and the electronic device 300 (for example, a TV) is performed in the manufacturing factory of the electronic device 300.

Figure 2A:
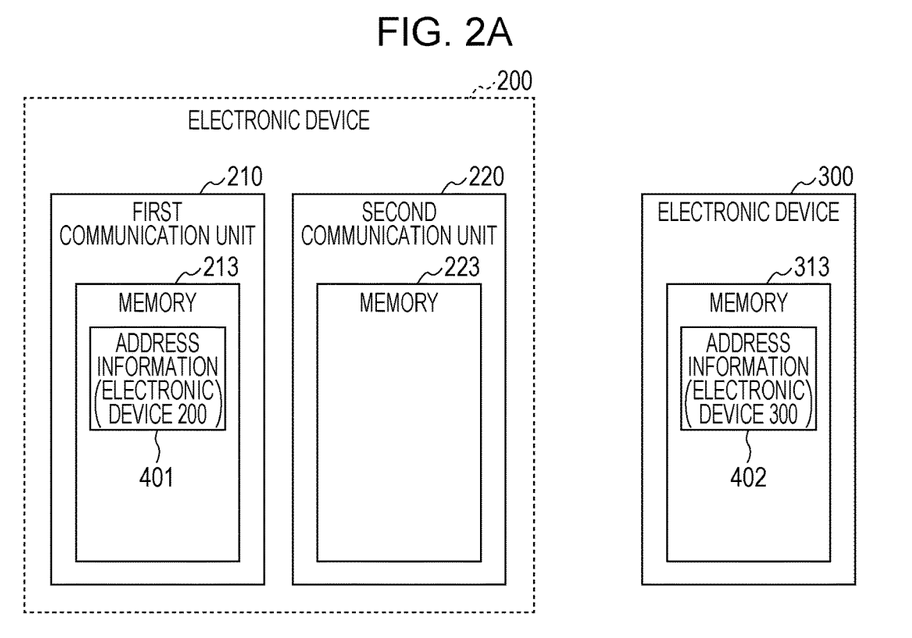
FIGS. 2A and 2B are diagrams schematically illustrating a communication example of address information that is transacted between an electronic device and another electronic device in the first embodiment of the present technology.

As illustrated in FIG. 2A, address information (electronic device 200) 401 that is used in the wireless communication performed by the wireless communication unit 211 of the first communication unit 210 is stored in the memory 213 of the electronic device 200. Address information (electronic device 300) 402 that is used in the wireless communication performed by the wireless communication unit 311 of the electronic device 300 is stored in the memory 313 of the electronic device 300.

Here, for the reading of various information from the memory 213 of the first communication unit 210 in the electronic device 200 and the writing of the various information to the memory 213, it is necessary for the power source of the electronic device 200 to be turned on. In contrast, for the reading of various information from the memory 223 of the second communication unit 220 in the electronic device 200 and the writing of the various information to the memory 223, the power source from the electronic device 200 is not necessary.

Figure 2B:
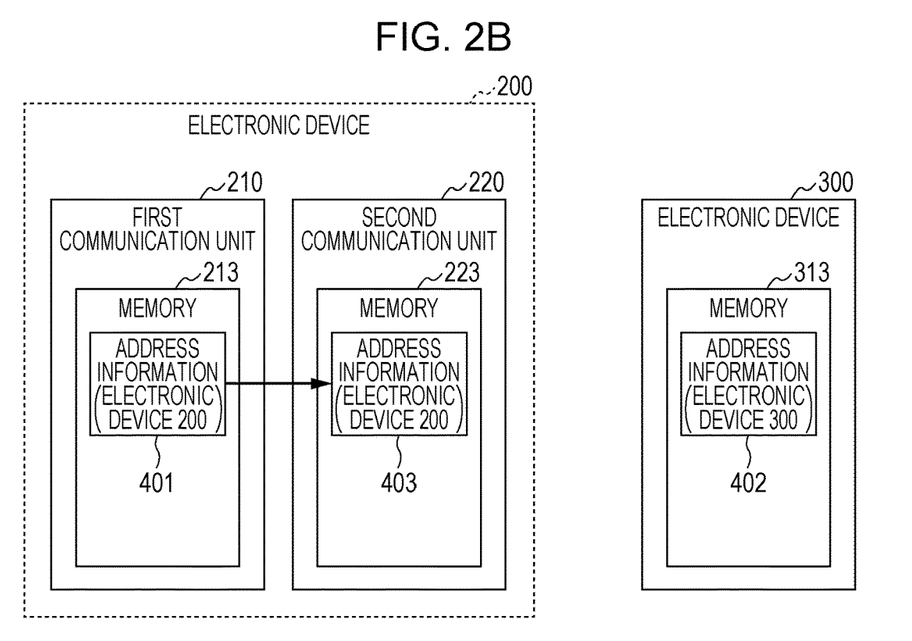

As illustrated in FIG. 2B, address information (electronic device 200) 401 that is stored in the memory 213 in the electronic device 200 is copied to the memory 223. For example, when the first communication unit 210 and the second communication unit 220 are connected to a signal line capable of carrying out transactions of various information, it is possible to copy the address information (electronic device 200) 401 from the memory 213 to the memory 223 via the signal line. For example, when the first communication unit 210 and the second communication unit 220 are not directly connected to each other, the address information (electronic device 200) 401 is copied from the memory 213 to the memory 223 using an external device (for example, the information processing device and the NFC R/W device). Accordingly, even if the power source of the electronic device 200 is in the off state, it is possible to read the address information (electronic device 200) 403 of the electronic device 200.

Here, description will be given of an example in which address information (electronic device 200) 403 and the address information (electronic device 300) 402 are exchanged. In this case, the power source of the electronic device 200 may be in the off state.

For example, the electronic device 200 is brought into the proximity of the NFC R/W device 340 until a distance is reached at which the near field wireless communication is possible. Accordingly, it is possible to perform the near field wireless communication between the electronic device 200 and the NFC R/W device 340. For example, when using NFC, the distance at which it is possible to perform the near field wireless communication is approximately 10 cm.

For example, in NFC, communication is performed regularly between the devices. For example, a polling command is issued regularly from the NFC R/W device 340.

For example, when there is a response (a polling response) in relation to the polling command that is issued regularly, the NFC R/W device 340 can perform data communication using NFC. Therefore, when the polling response is received, the NFC R/W device 340 performs the process of exchanging the address information.

Figure 3A:
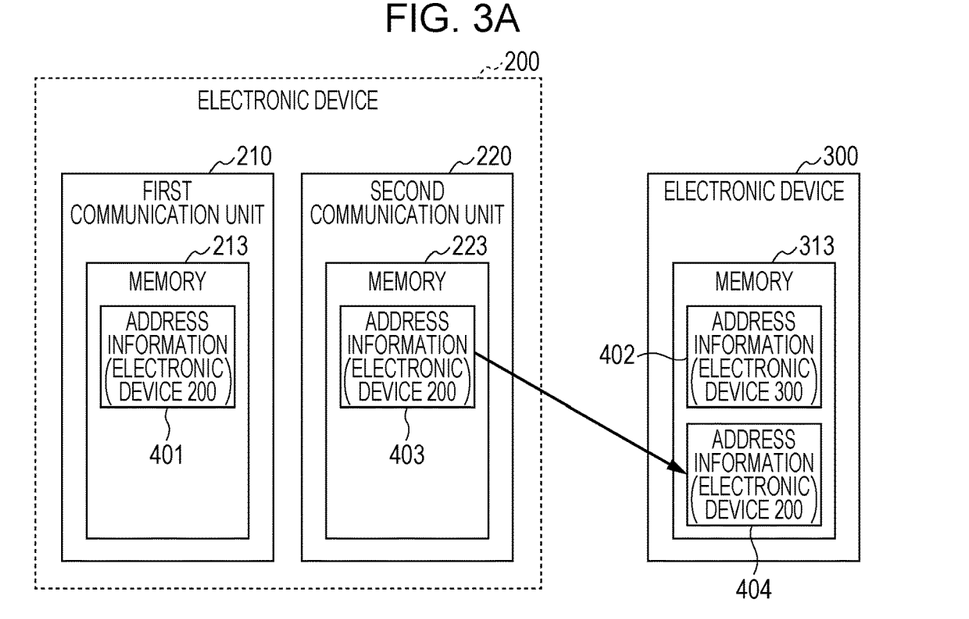
FIGS. 3A and 3B are diagrams schematically illustrating a communication example of address information that is transacted between the electronic device and the other electronic device in the first embodiment of the present technology.

For example, as illustrated in FIG. 3A, the NFC R/W device 340 reads the address information (electronic device 200) 403 from the memory 223 of the electronic device 200 based on the control of the information processing device 330. The information processing device 330 transmits the address information (electronic device 200) 403 that is read from the memory 223 by the NFC R/W device 340 to the electronic device 300 via the connector for wiring connection 320, and writes the address information (electronic device 200) 403 to the memory 313. In this manner, address information (electronic device 200) 404 is written to the memory 313.

Figure 3B:
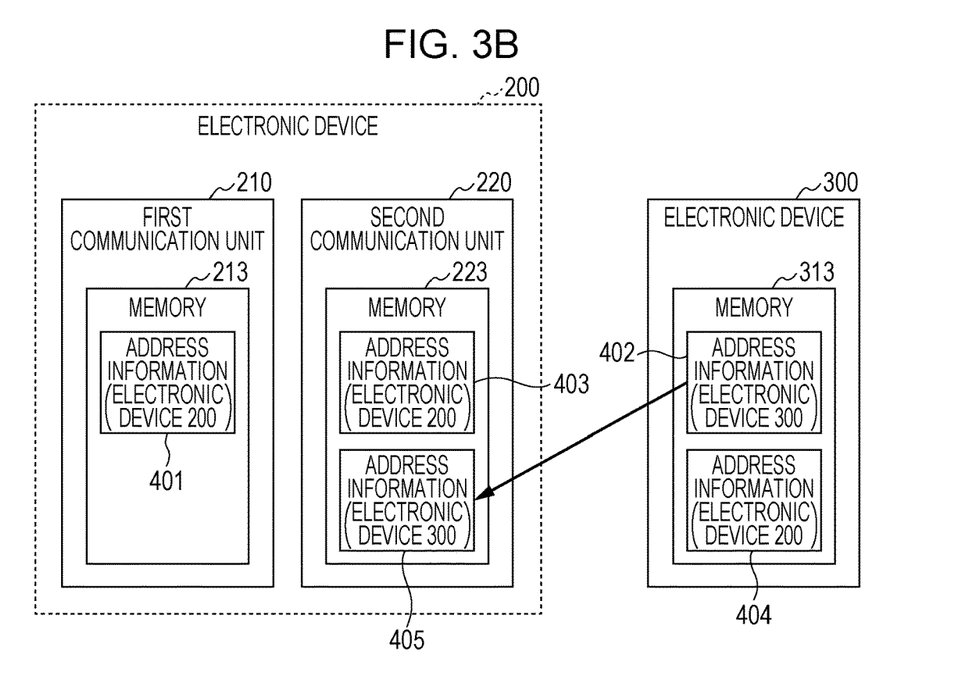

For example, as illustrated in FIG. 3B, information processing device 330 reads the address information (electronic device 300) 402 from the memory 313 of the electronic device 300. The information processing device 330 transmits the address information (electronic device 300) 402 that is read from the memory 313 to the NFC R/W device 340. Subsequently, the NFC R/W device 340 transmits the address information (electronic device 300) 402 to the electronic device 200, and writes the address information (electronic device 300) 402 to the memory 223. In this manner, address information (electronic device 300) 405 is written to the memory 223.

In the same manner as the process of exchanging the address information, the key information that is used when performing the wireless communication between the electronic device 200 and the electronic device 300 may be transacted between the electronic device 200 and the electronic device 300. The transactions of the key information may be carried out together with those of the address information, and the transactions may be carried out in a predetermined order (for example, address information→key information).

Setting Example of Address Information

Figure 4:
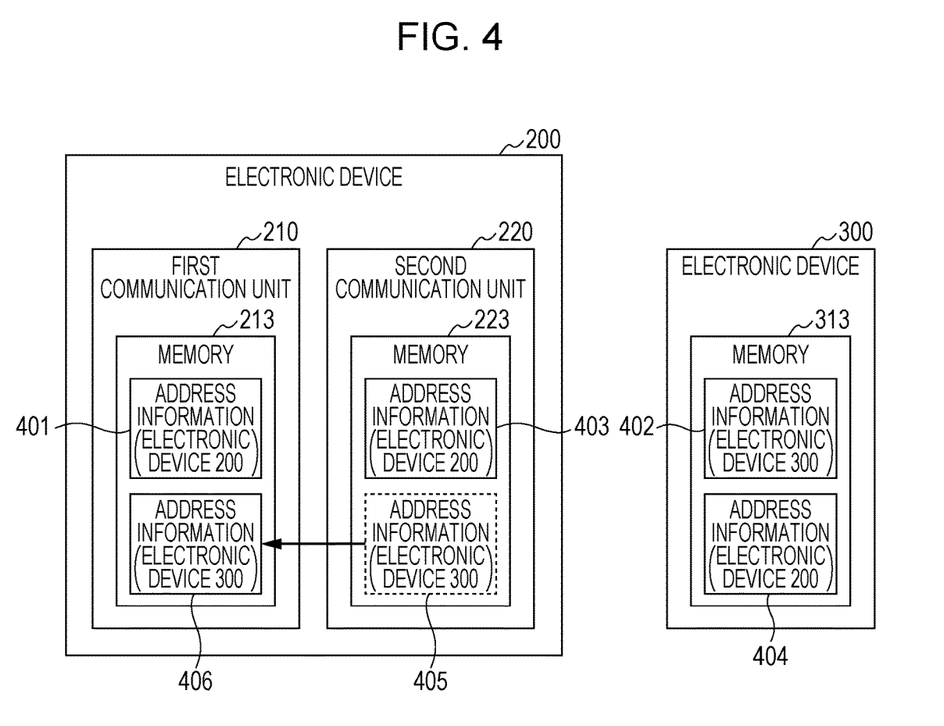
FIG. 4 is a diagram schematically illustrating a case in which the address information is set in the electronic device in the first embodiment of the present technology.

FIG. 4 is a diagram schematically illustrating a case in which the address information is set in the electronic device 200 in the first embodiment of the present technology.

FIG. 4 illustrates an example in which, when the power source of the electronic device 200 is first turned on, the address information is set in the electronic device 200.

In a state before the power source of the electronic device 200 is first turned on, as described above, the address information (electronic device 300) 405 is stored in the memory 223. In a state before the power source of the electronic device 200 is first turned on, as described above, the address information (electronic device 300) 402 may not be written to the memory 213.

Therefore, at the timing at which the power source of the electronic device 200 is first turned on, as illustrated in FIG. 4, the control unit 212 reads the address information (electronic device 300) 405 that is stored in the memory 223, and writes the address information (electronic device 300) 405 to the memory 213. Accordingly, the address information is set in the electronic device 200. The wireless communication unit 211 is capable of performing the wireless communication with the wireless communication unit 311 of the electronic device 300 using the address information (electronic device 300) 406 that is stored in the memory 213.

Note that, a case will be assumed in which the first communication unit 210 and the second communication unit 220 are not directly connected to each other. In this case, it is possible to adopt a configuration in which the address information (electronic device 300) 405 that is stored in the memory 223 is read and is written to the memory 213 using an external device (for example, the information processing device and the NFC R/W device).

Note that, it is assumed that the wireless communication unit 211 is capable of using the address information (electronic device 300) 405 that is stored in the memory 223. In this case, as described above, the movement of the address information (electronic device 300) 405 from the memory 223 to the memory 213 may not be performed. The wireless communication unit 211 is capable of performing the wireless communication with the wireless communication unit 311 using the address information (electronic device 300) 405 that is stored in the memory 223.

Communication Example

Figure 5:
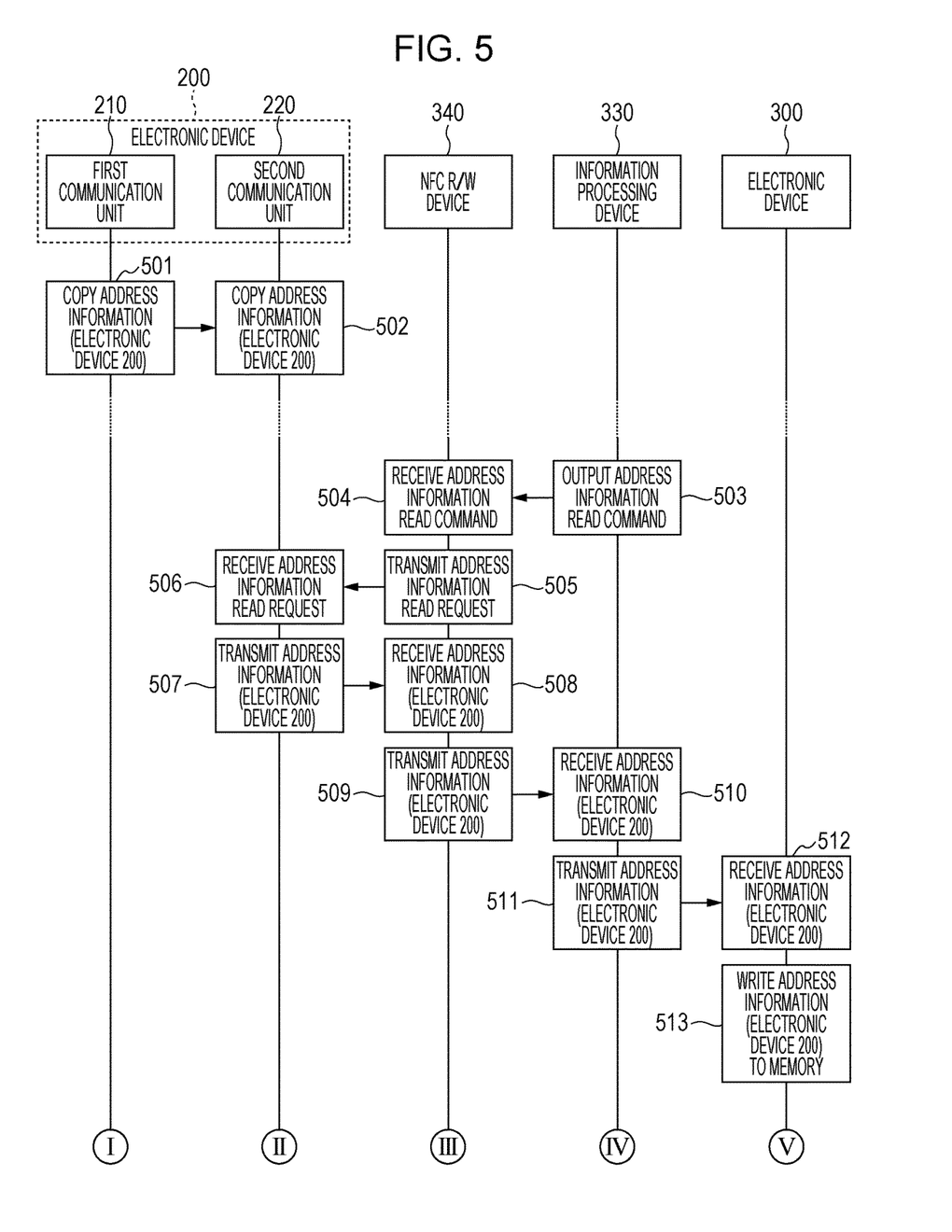
FIG. 5 is a sequence chart illustrating an example of communication processes between the devices which configure the communication system in the first embodiment of the present technology.
Figure 6:
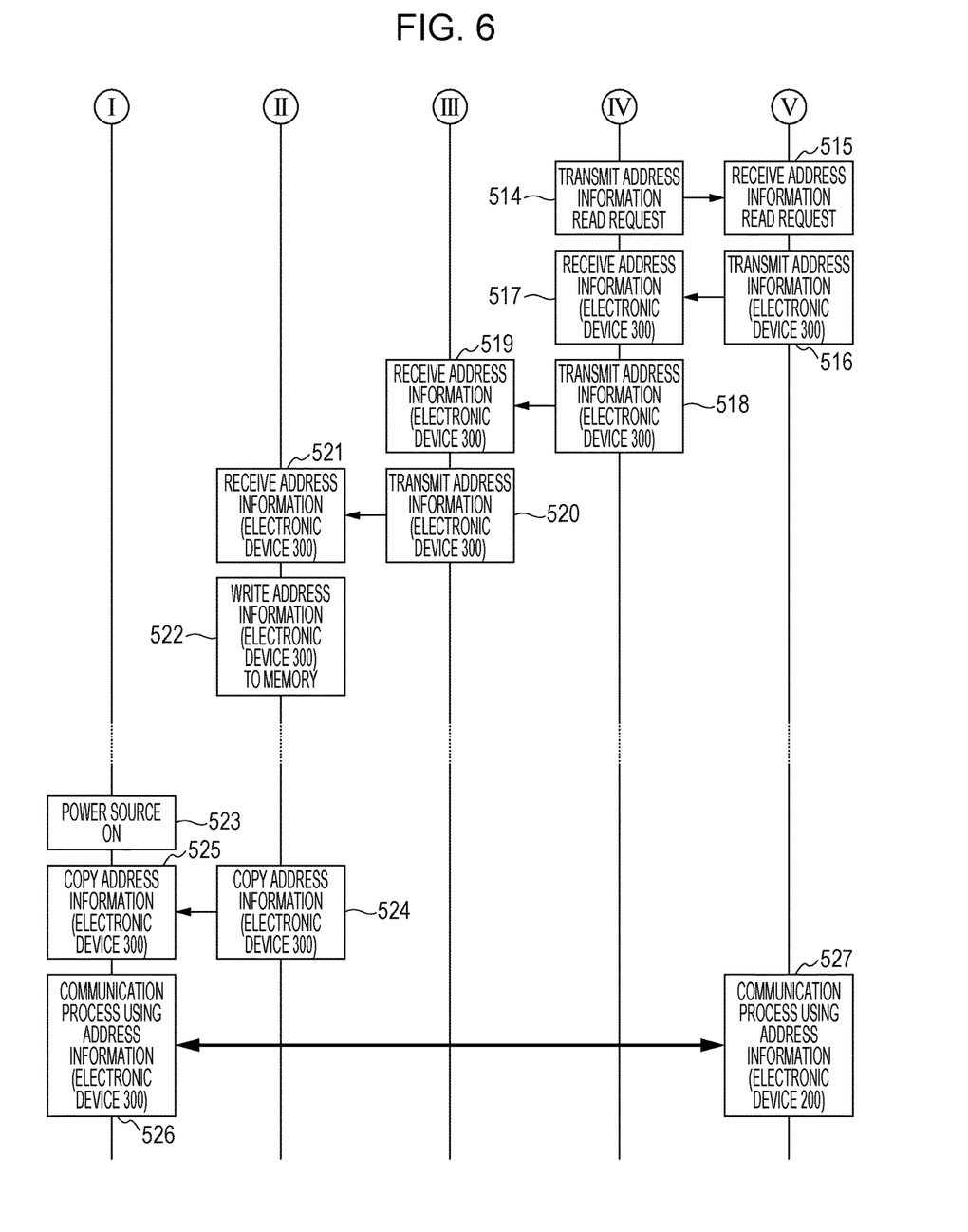
FIG. 6 is a sequence chart illustrating an example of the communication processes between the devices which configure the communication system in the first embodiment of the present technology.

FIGS. 5 and 6 are a sequence chart illustrating an example of communication processes between the devices which configure the communication system 100 in the first embodiment of the present technology.

For example, a case will be assumed in which an exchange process in which the address information is exchanged between the electronic device 200 (for example, an RF remote controller) and the electronic device 300 (for example, a TV) is performed in the manufacturing factory of the electronic device 300.

First, in the electronic device 200, the address information (electronic device 200) that is stored in the memory 213 of the first communication unit 210 is copied to the memory 223 of the second communication unit 220 (501 and 502).

Next, the electronic device 200 is brought into the proximity of the NFC R/W device 340 until a distance is reached at which the near field wireless communication is possible. Accordingly, it is possible to perform the near field wireless communication between the electronic device 200 and the NFC R/W device 340.

In this manner, when it becomes possible to perform the near field wireless communication between the electronic device 200 and the NFC R/W device 340, the information processing device 330 outputs an address information read command to the NFC R/W device 340 (503 and 504). The address information read command is information for commanding the reading of the address information (electronic device 200) that is stored in the memory 223 of the electronic device 200.

When the address information read command is received (504), the NFC R/W device 340 transmits an address information read request to the electronic device 200 (505 and 506). The address information read request is information for requesting the reading of the address information (electronic device 200) that is stored in the memory 223 of the electronic device 200.

When the address information read request is received (506), the control unit 222 of the second communication unit 220 reads the address information (electronic device 200) that is stored in the memory 223 of the second communication unit 220, and transmits the address information (electronic device 200) to the NFC R/W device 340 (507 and 508).

When the address information (electronic device 200) is received (508), the NFC R/W device 340 transmits the address information (electronic device 200) to the information processing device 330 (509 and 510).

When the address information (electronic device 200) is received (510), the information processing device 330 transmits the address information (electronic device 200) to the electronic device 300 via the connector for wiring connection 320, and writes the address information (electronic device 200) to the memory 313 (511 to 513).

Next, the information processing device 330 transmits the address information read request to the electronic device 300 (514 and 515). The address information read request is information for requesting the reading of the address information (electronic device 300) that is stored in the memory 313 of the electronic device 300.

When the address information read request is received (515), the control unit 312 of the communication unit 310 reads the address information (electronic device 300) that is stored in the memory 313 of the communication unit 310, and transmits the address information (electronic device 300) to the information processing device 330 (516 and 517).

When the address information (electronic device 300) is received (517), the information processing device 330 transmits the address information (electronic device 300) to the NFC R/W device 340 (518 and 519).

When the address information (electronic device 300) is received (519), the NFC R/W device 340 transmits the address information (electronic device 300) to the electronic device 200, and stores the address information (electronic device 300) in the memory 223 (520 to 522).

Next, when the power source of the electronic device 200 is first turned on (523), the control unit 212 of the first communication unit 210 reads the address information (electronic device 300) that is stored in the memory 223 of the second communication unit 220. The control unit 212 of the first communication unit 210 writes the address information (electronic device 300) to the memory 213 of the first communication unit 210 (524 and 525). Accordingly, the address information is set in the electronic device 200.

Next, the wireless communication unit 211 of the first communication unit 210 performs the wireless communication with the wireless communication unit 311 of the electronic device 300 using the address information (electronic device 300) that is stored in the memory 213 (526 and 527).

Note that, in FIGS. 5 and 6, an example is illustrated in which the address information (electronic device 300) of the electronic device 300 is written to the electronic device 200 after writing the address information (electronic device 200) of the electronic device 200 to the electronic device 300. However, the order in which the reading processes and the writing processes of the address information (electronic device 200) and the address information (electronic device 300) are performed is not limited thereto. For example, a configuration may be adopted in which the address information (electronic device 200) of the electronic device 200 is written to the electronic device 300 after writing the address information (electronic device 300) of the electronic device 300 to the electronic device 200. The reading processes and the writing processes of the address information (electronic device 200) and the address information (electronic device 300) may be performed at approximately the same time.

As described above, the key information that is used when performing the process of exchanging the address information together with the wireless communication between the electronic device 200 and the electronic device 300 may be transacted between the electronic device 200 and the electronic device 300. For example, the information processing device 330 can write the same key information to both the electronic device 200 and the electronic device 300.

Operation Example of Electronic Device

Figure 7:
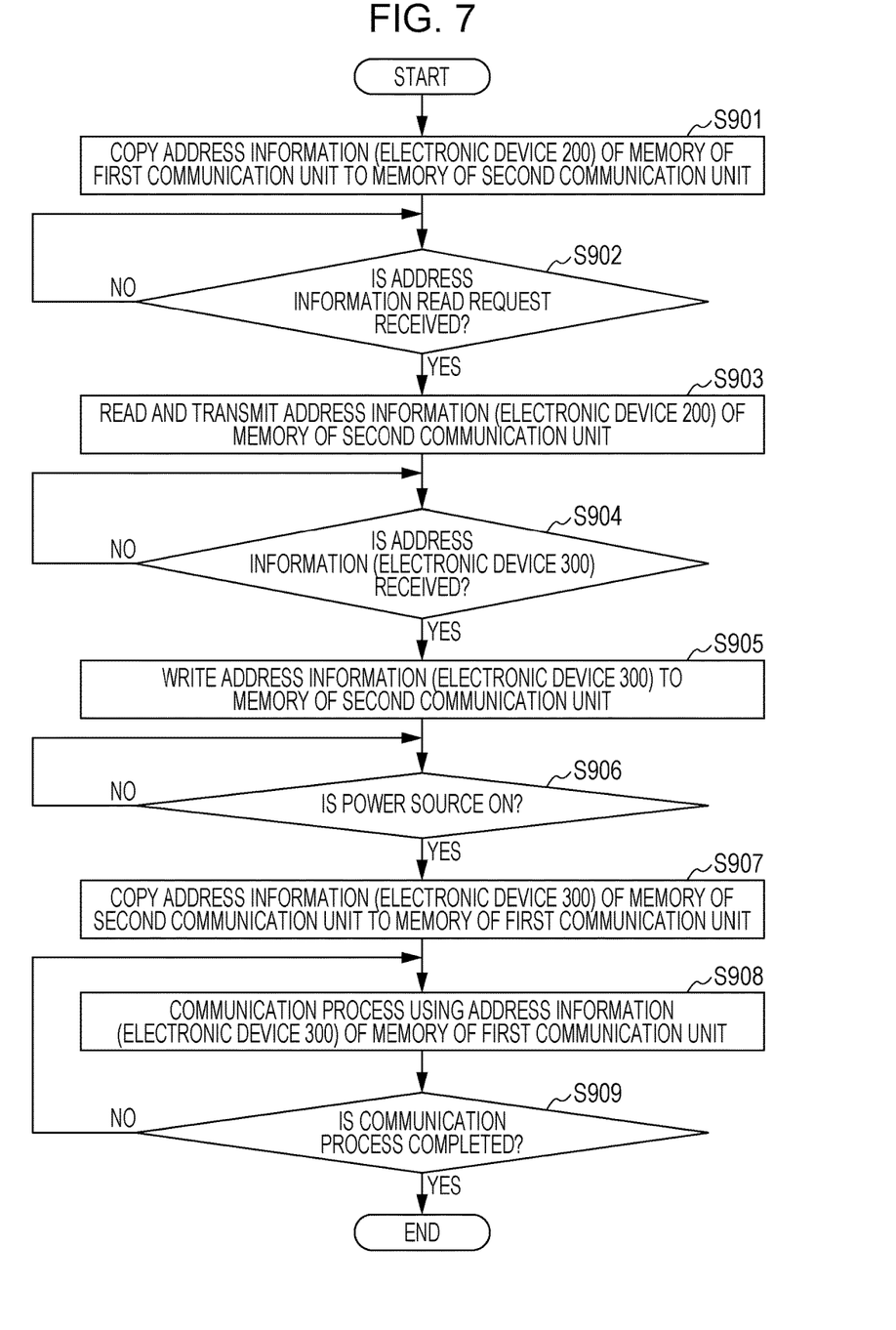
FIG. 7 is a flow chart illustrating an example of a processing procedure of an address information setting process that is performed by the electronic device in the first embodiment of the present technology.

FIG. 7 is a flow chart illustrating an example of a processing procedure of an address information setting process that is performed by the electronic device 200 in the first embodiment of the present technology.

First, in the electronic device 200, the address information (electronic device 200) that is stored in the memory 213 of the first communication unit 210 is copied to the memory 223 of the second communication unit 220 (step S901).

Next, when near field wireless communication becomes possible in the second communication unit 220, the control unit 222 of the second communication unit 220 determines whether or not the address information read request is received (step S902). When the address information read request is not received (step S902), continued monitoring is performed.

When the address information read request is received (step S902), the control unit 222 of the second communication unit 220 reads the address information (electronic device 200) that is stored in the memory 223 of the second communication unit 220 (step S903). The control unit 222 of the second communication unit 220 transmits the address information (electronic device 200) using near field wireless communication (step S903).

Next, the control unit 222 of the second communication unit 220 determines whether or not the address information (electronic device 300) is received (step S904). When the address information (electronic device 300) is not received (step S904), continued monitoring is performed.

When the address information (electronic device 300) is received (step S904), the control unit 222 of the second communication unit 220 writes the address information (electronic device 300) to the memory 223 of the second communication unit 220 (step S905). Note that, step S902 to step S905 are an example of a first communication procedure.

Next, it is determined whether or not the power source of the electronic device 200 is first turned on (step S906). When the power source of the electronic device 200 is first turned on (step S906), the control unit 212 of the first communication unit 210 reads the address information (electronic device 300) that is stored in the memory 223 of the second communication unit 220 (step S907). The control unit 212 of the first communication unit 210 writes the address information (electronic device 300) to the memory 213 of the first communication unit 210 (step S907). Accordingly, the address information is set in the electronic device 200.

Next, the wireless communication unit 211 of the first communication unit 210 performs the wireless communication with the wireless communication unit of the other electronic device using the address information (electronic device 300) that is stored in the memory 213 (step S908). Note that, step S908 is an example of a second communication procedure.

Next, it is determined whether or not the wireless communication is complete (step S909), and when the wireless communication is complete, the operations of the address information setting process are completed. When the wireless communication is not complete (step S909), the process returns to step S908.

In this manner, the second communication unit 220 carries out the transactions of the information (the address information) that is necessary in the pairing with the electronic device 300 performed by the first communication unit 210 using near field wireless communication with the electronic device 300. In this case, the address information relating to the electronic device 200 that is held in the memory 223 of the second communication unit 220 is read and output to the electronic device 300 using the near field wireless communication. The address information relating to the electronic device 300 is written to the memory 223 of the second communication unit 220 using the near field wireless communication.

The control unit 212 of the first communication unit 210 sets the address information that is written to the memory 223 of the second communication unit 220 as valid address information at the timing at which the power source of the electronic device 200 is turned on.

Example of Writing Key Information Generated by Each Device

As described above, it is possible to transact the address information together with the key information between each of the devices. The key information is generated by one of the electronic device 200, the electronic device 300, and the information processing device 330, and the generated key information may be written to the other device. Therefore, here, an example is illustrated in which the key information that is generated by one of the electronic device 200, the electronic device 300, and the information processing device 330 is written to the other device.

Figure 8A:
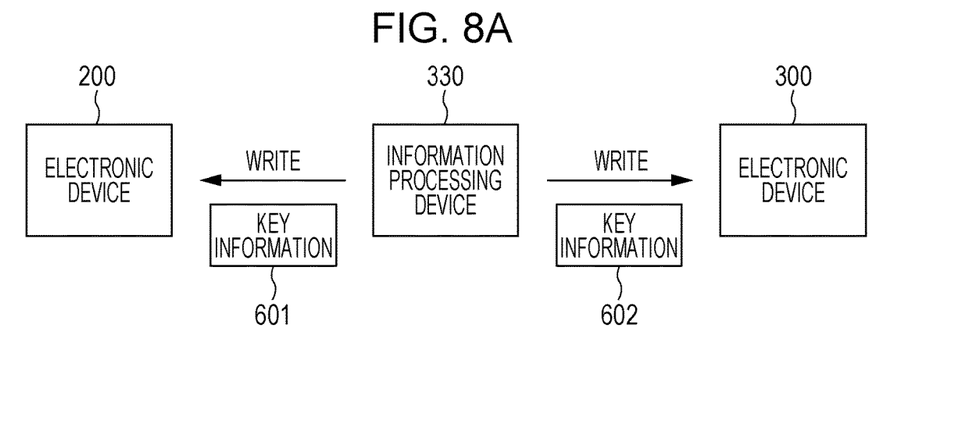
FIGS. 8A to 8C are diagrams schematically illustrating a communication example of key information that is transacted between the electronic device, the other electronic device, and an information processing device in the first embodiment of the present technology.
Figure 8B:
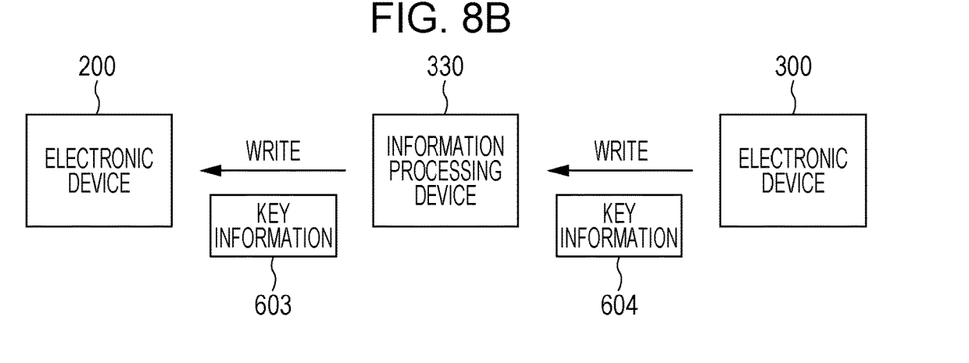
Figure 8C:
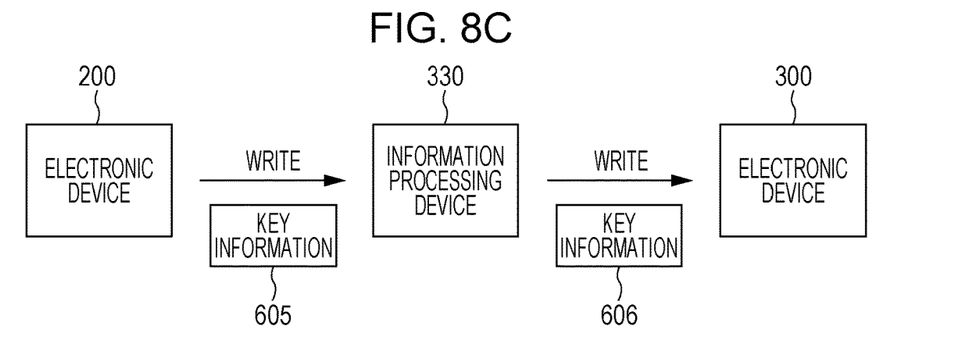

FIGS. 8A to 8C are diagrams schematically illustrating a communication example of key information that is transacted between the electronic device 200, the electronic device 300, and the information processing device 330 in the first embodiment of the present technology.

FIG. 8A illustrates an example in which the key information is generated by the information processing device 330. In this case, the information processing device 330 transmits and writes generated key information 601 and 602 to the electronic device 200 and the electronic device 300. For example, the information processing device 330 can transmit the key information 602 to the electronic device 300 at the timing at which the address information (electronic device 200) is transmitted to the electronic device 300 (for example, 511 and 512 illustrated in FIG. 5). For example, the information processing device 330 can transmit the key information 601 to the electronic device 200 at the timing at which the address information (electronic device 300) is transmitted to the electronic device 200 (for example 518 and 521 illustrated in FIG. 5).

FIG. 8B illustrates an example in which the key information is generated by the electronic device 300. In this case, the electronic device 300 transmits and writes generated key information 603 and 604 to the electronic device 200 and the information processing device 330. For example, the electronic device 300 can transmit the key information 604 to the information processing device 330 at the timing at which the address information (electronic device 300) is transmitted to the information processing device 330 (for example, 516 and 517 illustrated in FIG. 6). For example, the information processing device 330 can transmit the key information 603 to the electronic device 200 at the timing at which the address information (electronic device 300) is transmitted to the electronic device 200 (for example 518 and 521 illustrated in FIG. 5).

FIG. 8C illustrates an example in which the key information is generated by the electronic device 200. In this case, the electronic device 200 transmits and writes generated key information 605 and 606 to the electronic device 300 and the information processing device 330. For example, the electronic device 200 can transmit the key information 605 to the information processing device 330 at the timing at which the address information (electronic device 200) is transmitted to the information processing device 330 (for example, 507 to 510 illustrated in FIG. 5). For example, the information processing device 330 can transmit the key information 606 to the electronic device 300 at the timing at which the address information (electronic device 200) is transmitted to the electronic device 300 (for example, 511 and 512 illustrated in FIG. 5).

Second Embodiment

In the first embodiment of the present technology, an example is illustrated in which the valid address information is set at the timing at which the power source of the electronic device 200 is first turned on. In other words, an example is illustrated in which the address information (electronic device 300) that is stored in the memory 223 of the second communication unit 220 is written to the memory 213 of the first communication unit 210 at the timing at which the power source of the electronic device 200 is first turned on. However, it is also anticipated that, due to some reason, the connection process may not be performed using the address information (electronic device 300) that is stored in the memory 223 of the second communication unit 220.

Therefore, in the second embodiment of the present technology, the address information (electronic device 300) that is stored in the memory 223 of the second communication unit 220 is set as temporary address information. An example is illustrated in which the address information (electronic device 300) is set as the valid address information on a condition that communication using the temporary address information is successful. In other words, an example is illustrated in which, instead of directly after the power source of the electronic device 200 is first turned on, when the communication temporarily using the temporary address information is first successful, the temporary address information is set as the valid address information. Note that, since the communication system in the second embodiment of the present technology is the same as the communication system 100 illustrated in FIG. 1, portions that are shared with the communication system 100 will be given the same reference numerals, and description relating thereto will be omitted.

Operation Example of Electronic Device

Figure 9:
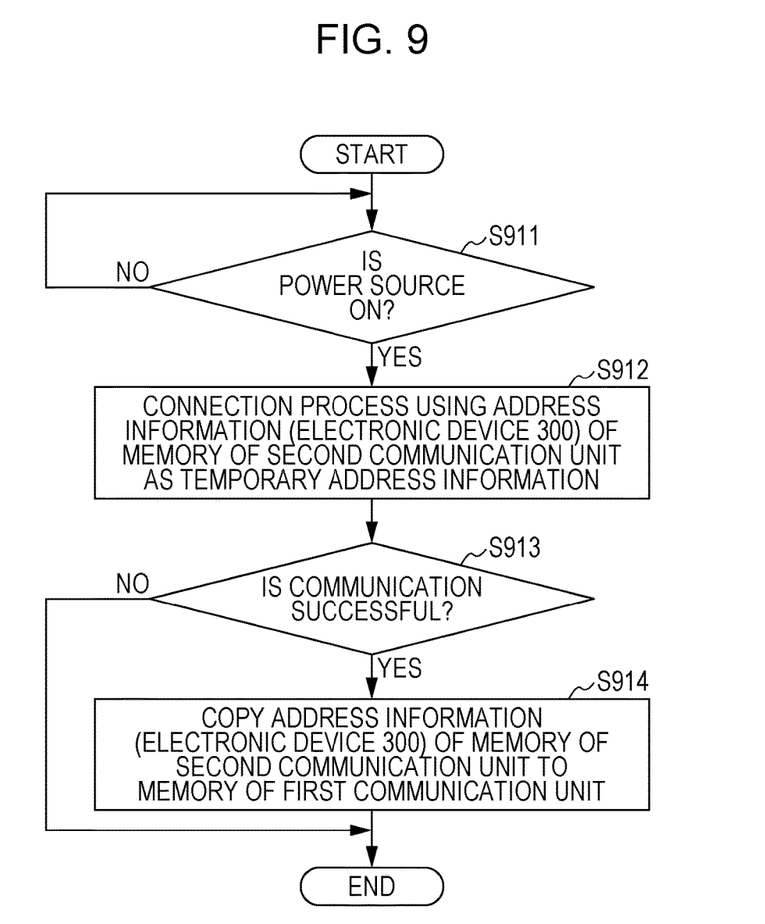
FIG. 9 is a flow chart illustrating an example of a processing procedure of an address information setting process that is performed by the electronic device in a second embodiment of the present technology.

FIG. 9 is a flow chart illustrating an example of a processing procedure of an address information setting process that is performed by the electronic device 200 in a second embodiment of the present technology. Note that, in FIG. 9, an example is illustrated of a processing procedure that corresponds to the processing procedure illustrated in FIG. 7 (steps S906 and S907).

First, it is determined whether or not the power source of the electronic device 200 is first turned on (step S911). When the power source of the electronic device 200 is first turned on (step S911), the control unit 212 of the first communication unit 210 uses the address information (electronic device 300) that is stored in the memory 223 of the second communication unit 220 as a temporary address. The control unit 212 of the first communication unit 210 performs the connection process with the wireless communication unit of the other electronic device using the temporary address information (electronic device 300) (step S912).

Next, the control unit 212 of the first communication unit 210 determines whether or not the connection process using the temporary address information is successful (step S913). When the connection process using the temporary address information is not successful (step S913), the operation of the address information setting process is completed.

When the connection process using the temporary address information is successful (step S913), the control unit 212 of the first communication unit 210 reads the address information (electronic device 300) that is stored in the memory 223 of the second communication unit 220 (step S914). The control unit 212 of the first communication unit 210 writes the address information (electronic device 300) to the memory 213 of the first communication unit 210 (step S914). Accordingly, the temporary address information is set as valid address information in the electronic device 200.

In this manner, the control unit 212 of the first communication unit 210 performs the connection process with the electronic device 300 temporarily using the address information that is written to the memory 223 of the second communication unit 220 at the timing at which the power source of the electronic device 200 is turned on. When the connection process is successful, the control unit 212 of the first communication unit 210 sets the address information as the valid address information.

Here, when the two electronic devices are packaged together and dispatched from the factory, it is assumed that the dispatching will be performed after completing the pairing at the factory. A case is also anticipated in which, depending on the electronic devices that are packaged together, an electronic device that is manufactured at a different factory is added to the package before delivery. Even in this case, it is possible to easily perform the pairing between the first electronic device (for example, the controlling device) and the second device (for example, the controlled device) in the factory of the second electronic device using an NFC tag to which information may be written even without turning the power on. In other words, even in a state in which the power source of the first electronic device is not turned on, it is possible for the NFC R/W device to perform the writing of the address information of the first electronic device. Accordingly, it is possible to perform the pairing of the first electronic device and the second electronic device without turning on the power source using the NFC tag of the first electronic device. It is possible to appropriately perform the pairing without turning on the power source of the electronic device that is manufactured in a separate factory.

After being dispatched from the factory, the first communication unit 210 of the electronic device 200 can use the address information of the electronic device 300 that is written to the memory 223 of the second communication unit 220 at the timing at which the power source of the electronic device 200 is first turned on by the user. Accordingly, after being dispatched from the factory, the first communication unit 210 of the electronic device 200 can perform communication with the electronic device 300 directly after the user first turns on the power source of the electronic device 200. In other words, the pairing operation by user operation after the electronic devices 200 and 300 are dispatched from the factory can be rendered unnecessary.

In this manner, in the embodiments of the present technology, it is possible for the NFC R/W device 340 to read the address information of the electronic device 200 and to write the address information to the electronic device 300, even in a state in which the power source of the electronic device 200 is not turned on.

Here, a case will be assumed in which the user performs the pairing operation (for example, a method in which the user inputs a number of several digits, and a method in which the user performs the pairing operation of the two electronic devices within a predetermined time). In this case, the load on the user is great, and, depending on the user, a case is anticipated in which the user may not understand the pairing operation and may not be able to perform the pairing. In contrast, in the embodiments of the present technology, when the pairing between the electronic devices is performed, it is not necessary for the user to perform the pairing operation (for example, a method in which the user inputs a number of several digits, and a method in which the user performs the pairing operation of the two electronic devices within a predetermined time).

In general, since the pairing sequence is a complex sequence in which various information is exchanged, there is a concern that the pairing using wireless communication will fail. Since the pairing transaction itself is complex in this manner, in an environment in which radio wave crosstalk is present, it is anticipated that the pairing may not be correctly executed. In contrast, in the first embodiment of the present embodiment, since the exchange of the address information is performed using the near field wireless communication, it is possible to prevent pairing failures that are peculiar to pairing using wireless. In the factory in which the electronic device 300 is manufactured, it is possible to render the hassle of package opening and repackaging of the electronic device 200 and of turning on the power source of the electronic device 200 unnecessary.

Here, a case is anticipated in which the user sets the address information by manually performing the pairing. In this case, for example, a case is anticipated in which a service engineer of the electronic device checks the address information that is set for maintenance purposes. In such a case in which the checking is performed, it is possible to copy the address information that is set by the pairing performed by the manual operation of the user to the memory 223 of the second communication unit 220 and to use the copied address information. In this case, it is possible to easily read the address information that is set by the pairing performed by the manual operation of the user using the external information processing device and the NFC R/W device, even in a state in which the power source of the electronic device 200 is turned off. Therefore, it is possible to easily check the address information, even for maintenance purposes.

Note that, in the embodiments of the present technology, an example is illustrated in which the pairing between the controlling device (the electronic device 200) such as an RF remote controller and the controlled device (the electronic device 300) such as a TV is performed. However, it is possible to also apply the embodiments of the present technology to pairing of other electronic devices. For example, it is possible to apply the embodiments of the present technology to electronic devices that are used in a pair (for example, a pair of electronic devices that are packaged together). An example of the electronic devices that are used in a pair is an RF remote controller and a household electronics device (for example, an audio device or an air conditioner) that uses the RF remote controller.

Note that, in the embodiments of the present technology, an example is illustrated in which the address information is written to nonvolatile memory; however, the address information may be written to other memory (for example, volatile memory (for example, random access memory (RAM))). A configuration may be adopted in which the address information is temporarily held in the other memory (for example, volatile memory) and is subsequently written to the nonvolatile memory.

Note that, the embodiments described above illustrate examples for realizing the present technology, and the items in the embodiments correlate to respective items in the claims. In the same manner, the items in the claims correlate to respective items in the embodiments of the present technology bearing the same name. However, the present technology is not limited to the embodiments, and can be realized by making various modifications to the embodiments within the scope of the main concept.

The processing procedures described in the embodiments described above may be perceived as a method including the sequence of procedures. Alternatively, the processing procedures may be perceived as a program for causing a computer to execute the sequence of procedures or as a recording medium that stores the program. A Compact Disc (CD), a Mini Disc (MD), a Digital Versatile Disc (DVD), a memory card, and a Blu-ray (registered trademark) disc are examples that can be used as the recording medium.

Note that, the effects described in the present specification are merely exemplary, embodiments are not to be limited thereto, and additional effects may be present.

Furthermore, the present technology may adopt the following configurations.

(1) An electronic device, including a first communication unit which performs wireless communication with another electronic device, and a second communication unit which carries out transactions of information, which is necessary for pairing with the other electronic device performed by the first communication unit, with the other electronic device using near field wireless communication.

(2) The electronic device according to (1), in which the information is connection destination information relating to each of the electronic device and the other electronic device, in which the second communication unit is provided with readable and writable memory, and in which the connection destination information relating to the electronic device that is held in the memory is read and output to the other electronic device using the near field wireless communication, and the connection destination information relating to the other electronic device is written to the memory using the near field wireless communication.

(3) The electronic device according to (2), further including a control unit which sets the connection destination information that is written to the memory as valid connection destination information at a timing at which a power source of the electronic device is turned on.

(4) The electronic device according to (2), further including a control unit which performs a connection process with the other electronic device temporarily using the connection destination information that is written to the memory at a timing at which a power source of the electronic device is turned on, and sets the connection destination information as valid connection destination information when the connection process is successful.

(5) The electronic device according to any one of (1) to (4), in which the second communication unit carries out the transactions of information with the other electronic device using the near field wireless communication even in a state in which a power source of the electronic device is not turned on.

(6) The electronic device according to any one of (1) to (5), in which the second communication unit carries out the transactions of information with the other electronic device via an information processing device capable of the near field wireless communication.

(7) The electronic device according to any one of (1) to (6), in which the second communication unit carries out the transactions of key information, which is used in wireless communication with the other electronic device performed by the first communication unit, with the other electronic device using the near field wireless communication.

(8) The electronic device according to any one of (1) to (7), in which the wireless communication performed by the first communication unit is a different communication system from the near field wireless communication performed by the second communication unit.

(9) A communication system including a first electronic device which includes a first communication unit which performs wireless communication with a second electronic device, and a second communication unit which carries out transactions of information, which is necessary for pairing with the second electronic device performed by the first communication unit, with the second electronic device using near field wireless communication, and a second electronic device which includes a communication unit which performs wireless communication with the first electronic device, and a control unit which carries out the transactions of information with the first electronic device via an information processing device capable of the near field wireless communication.

(10) A control method of an electronic device, the method including a first communication procedure which carries out transactions of information, which is necessary for pairing with another electronic device performed by a first communication unit with the other electronic device using wireless communication, with the other electronic device using near field wireless communication, and a second communication procedure in which the first communication unit performs wireless communication with the other electronic device using the transacted information.

(11) A program which causes a computer to execute a first communication procedure which carries out transactions of information, which is necessary for pairing with another electronic device performed by a first communication unit with the other electronic device using wireless communication, with the other electronic device using near field wireless communication and a second communication procedure in which the first communication unit performs wireless communication with the other electronic device using the transacted information.

It should be understood by those skilled in the art that various modifications, combinations, sub-combinations and alterations may occur depending on design requirements and other factors insofar as they are within the scope of the appended claims or the equivalents thereof.

What is claimed is:

1. A first electronic device, comprising:
a first communication circuit; and
a second communication circuit configured to:
  determine a command is received from an information processing device;
  read first address information of the first electronic device based on the determination that the command is received; and
  transmit, in a state in which a power source of the first electronic device is turned off, the first address information of the first electronic device to a second electronic device by near field wireless communication,
  wherein the first address information is utilized to pair the first electronic device with the second electronic device, and
  wherein the first communication circuit is configured to wirelessly communicate with the second electronic device based on key information generated by the information processing device.

2. The first electronic device according to claim 1,
wherein the second communication circuit comprises a memory,
wherein the first address information is read from the memory, and
wherein the second communication circuit is further configured to:
  receive second address information of the second electronic device by the near field wireless communication; and
  write the second address information to the memory.

3. The first electronic device according to claim 2, further comprising a central processing unit (CPU) configured to set the second address information written to the memory as valid address information at a time at which a power source of the first electronic device is turned on.

4. The first electronic device according to claim 2, further comprising a central processing unit (CPU) configured to:
connect with the second electronic device temporarily based on the second address information that is written to the memory at a time at which a power source of the first electronic device is turned on; and
set the second address information as valid address information based on a success of the connection between the CPU and the second electronic device.

5. The first electronic device according to claim 2, wherein the first address information and the second address information are media access control (MAC) addresses.

6. The first electronic device according to claim 2, wherein the first address information and the second address information are Bluetooth addresses.

7. The first electronic device according to claim 2, wherein the first address information and the second address information are determined based on a type of wireless communication utilized by the first communication circuit.

8. The first electronic device according to claim 1,
wherein the second communication circuit is further configured to transmit the first address information to the second electronic device via the information processing device, and
wherein the information processing device is configured to communicate with the first electronic device and the second electronic device based on the near field wireless communication.

9. The first electronic device according to claim 8, wherein the second communication circuit is further configured to receive a polling command from the information processing device to initiate an operation of the first electronic device.

10. The first electronic device according to claim 1,
wherein the information processing device transmits the key information to the first electronic device and the second electronic device, and
wherein the key information is used in the wireless communication of the first communication circuit with the second electronic device.

11. The first electronic device according to claim 10, wherein the first communication circuit is further configured to encrypt and encode information communicated wirelessly based on the key information.

12. The first electronic device according to claim 1, wherein the wireless communication of the first communication circuit is different from the near field wireless communication of the second communication circuit.

13. The first electronic device according to claim 1, wherein the key information comprises one of a network key, a link key, or a security link key.

14. A communication system, comprising:
a first electronic device; and
a second electronic device,
wherein the first electronic device includes:
a first communication circuit; and
a second communication circuit configured to:
determine a command is received from an information processing device;
read first address information of the first electronic device based on the determination that the command is received; and
transmit, in a state in which a power source of the first electronic device is turned off, the first address information of the first electronic device to the second electronic device by near field wireless communication,
wherein the first address information is utilized to pair the first electronic device with the second electronic device, and
wherein the first communication circuit is configured to wirelessly communicate with the second electronic device based on key information generation by the information processing device; and
wherein the second electronic device includes:
a third communication circuit configured to transmit, in the state in which the power source of the first electronic device is turned off, second address information of the second electronic device to the first electronic device via the information processing device based on the near field wireless communication.

15. A method, comprising:
in a first electronic device:
determining a command is received from an information processing device;
reading address information of the first electronic device based on the determination that the command is received;
transmitting, in a state in which a power source of the first electronic device is turned off, the address information of the first electronic device to a second electronic device using near field wireless communication,
wherein the address information is utilized to pair the first electronic device with the second electronic device; and
wirelessly communicating with the second electronic device based on key information generated by the information processing device.

16. A non-transitory computer-readable medium having stored thereon computer-executable instructions that, when executed by a processor, cause a first electronic device to execute operations, the operations comprising:
determining a command is received from an information processing device;
reading address information of the first electronic device based on the determination that the command is received;
transmitting, in a state in which a power source of the first electronic device is turned off, the address information of the first electronic device, to a second electronic device using near field wireless communication,
wherein the address information is utilized to pair the first electronic device with the second electronic; and
wirelessly communicating with the second electronic device based on key information generated by the information processing device.

* * * * *